United States Patent
Park et al.

(10) Patent No.: US 9,066,069 B2
(45) Date of Patent: Jun. 23, 2015

(54) METHOD OF REMOVING JAGGING OF STEREOSCOPIC IMAGE AND STEREOSCOPIC IMAGE DISPLAY DEVICE USING THE SAME

(75) Inventors: Myungsoo Park, Seoul (KR); Jaewoo Lee, Paju-si (KR); Hyejin Kim, Goyang-si (KR); Bogyun Chung, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 463 days.

(21) Appl. No.: 13/450,780

(22) Filed: Apr. 19, 2012

(65) Prior Publication Data
US 2012/0268461 A1    Oct. 25, 2012

(30) Foreign Application Priority Data

Apr. 20, 2011    (KR) .................. 10-2011-0036683

(51) Int. Cl.
*G09G 5/00* (2006.01)
*H04N 13/00* (2006.01)
*H04N 13/04* (2006.01)

(52) U.S. Cl.
CPC ....... *H04N 13/0007* (2013.01); *H04N 13/0434* (2013.01)

(58) Field of Classification Search
None
See application file for complete search history.

(56) References Cited

U.S. PATENT DOCUMENTS

| | | | |
|---|---|---|---|
| 2005/0225564 A1 | 10/2005 | Shan | |
| 2008/0080049 A1* | 4/2008 | Hamagishi et al. | 359/466 |
| 2008/0112636 A1* | 5/2008 | Lee et al. | 382/255 |
| 2009/0051685 A1 | 2/2009 | Takagi et al. | |

(Continued)

FOREIGN PATENT DOCUMENTS

| | | |
|---|---|---|
| CN | 1681313 A | 10/2005 |
| CN | 1917560 A | 2/2007 |
| CN | 101087413 A | 12/2007 |
| CN | 101374244 A | 2/2009 |

OTHER PUBLICATIONS

Office Action dated Apr. 29, 2014, issued by the State Intellectual Property Office of China in Chinese Patent Application No. 201210116647.1.

*Primary Examiner* — James A Thompson
(74) *Attorney, Agent, or Firm* — Morgan, Lewis & Bockius LLP

(57) ABSTRACT

This document relates to a method of removing jagging of a stereoscopic image and a stereoscopic image display device using the same. The method comprises: detecting left edges and right edges by analyzing left-eye image data and right-eye image data; replacing the left-eye image data on a $k^{th}$ line with the left-eye image data on a $(k-1)^{th}$ line in response to a first absolute value of a difference between a number of the left edges on the $(k-1)^{th}$ line and the $k^{th}$ line being equal to or more than a edge number threshold value; and replacing the right-eye image data on the $k^{th}$ line with the right-eye image data on the $(k-1)^{th}$ line in response to a second absolute value of a difference between a number of the right-eye edge data on the $(k-1)^{th}$ line and the $k^{th}$ line being equal to or more than the edge number threshold value.

20 Claims, 11 Drawing Sheets

(56) References Cited

U.S. PATENT DOCUMENTS

2011/0026776 A1* 2/2011 Liang et al. .................. 382/107
2011/0050850 A1* 3/2011 Yamada ......................... 348/43
2011/0102559 A1* 5/2011 Nakane .......................... 348/54
2011/0216177 A1* 9/2011 Chae et al. ..................... 348/57
2012/0154374 A1* 6/2012 Cheng et al. ................. 345/419

* cited by examiner

| <ORGBL> | <ORGBR> |
|---|---|
| 1L | 1R |
| 2L | 2R |
| 3L | 3R |
| 4L | 4R |
| ⋮ | ⋮ |
| 1079L | 1079R |
| 1080L | 1080R |

< RGB$_{3D}$ >

| 1L |
|---|
| 2L |
| 3L |
| 4L |
| ⋮ |
| 1079L |
| 1080L |

< RGBL >

| 1R |
|---|
| 2R |
| 3R |
| 4R |
| ⋮ |
| 1079R |
| 1080R |

< RGBR >

<left-eye edge image>

< left-eye quantization image >

FIG. 9

| 1L |
|---|
| 2L |
| 3L |
| 4L |
| ⋮ |
| 1079L |
| 1080L |

< RGBL >

| 1R |
|---|
| 2R |
| 3R |
| 4R |
| ⋮ |
| 1079R |
| 1080R |

< RGBR >

| 1L |
|---|
| 2R |
| 3L |
| 4R |
| ⋮ |
| 1079L |
| 1080R |

< RGB3D' (odd-numbered frame) >

| 2L |
|---|
| 1R |
| 4L |
| 3R |
| ⋮ |
| 1080L |
| 1079R |

< RGB3D' (even-numbered frame) >

US 9,066,069 B2

METHOD OF REMOVING JAGGING OF STEREOSCOPIC IMAGE AND STEREOSCOPIC IMAGE DISPLAY DEVICE USING THE SAME

CROSS-REFERENCE TO RELATED APPLICATION(S)

This application claims the benefit under 35 U.S.C. §119 (a) of Korean Patent Application No. 10-2011-0036683, filed on Apr. 20, 2011, in the Korean Intellectual Property Office, the entire disclosure of which is incorporated by reference herein for all purposes.

BACKGROUND

1. Field of the Invention

The following description relates to a method of removing jagging of a stereoscopic image (hereinafter, referred as a "three-dimensional (3D) image"), which removes jagging occurring while implementing the stereoscopic image in a patterned retarder method, and a stereoscopic image display device using the same.

2. Discussion of the Related Art

A technique implementing a stereoscopic image display device is classified into a stereoscopic technique or an autostereoscopic technique. The stereoscopic technique, which uses a binocular parallax image between left and right eyes of a viewer, includes a glass method and a non-glass method. The glass method is classified into a patterned retarder method (hereinafter, referred to as a "PR type") and a shutter glass method. In the PR type, it is possible to implement a three-dimensional (3D) image by using polarization glasses after displaying the binocular parallax image on a direct view-based display device or a projector by changing polarization direction. In the shutter glass method, it is possible to implement a 3D image by using liquid crystal shutter glasses after displaying the binocular parallax image on a direct view-based display device or a projector in a time division manner. In the non-glass method, it is possible to implement a 3D image by using an optical plate such as a parallax barrier or a lenticular lens for separating an optical axis of the binocular parallax image.

FIG. 1 is an example exploded perspective view illustrating a PR type stereoscopic image display device according to a related art. With reference to FIG. 1, the PR type stereoscopic image display device implements the 3D image using a polarization characteristic of a patterned retarder PR disposed on a display panel DIS and polarization characteristic of polarized glasses PG which a user wears. The PR type stereoscopic image display device displays a left-eye image on odd-numbered lines of the display panel DIS and displays a right-eye image on even-numbered lines of the display panel DIS. The left-eye image is converted into left-circularly polarized light by the patterned retarder PR. The right-eye image is converted into right-circularly polarized light by the patterned retarder PR. A left eye polarizing filter of the polarized glasses PG passes through only the left-circularly polarized light, and a right eye polarizing filter of the polarized glasses PG passes through only the right-circularly polarized light. Therefore, the user views only the left-eye image through his or her left eye and views only the right-eye image through his or her right eye.

FIG. 2 is an example photograph illustrating a 3D image on which jagging is visible. With reference to FIG. 2, a 3D image displays a line, but the user may view that the line is cut off in an area A, which is shown under a polarizing lens taped to the image. That is, in case of the PR type stereoscopic image display device, a boundary portion of the 3D image such as between an object and another object or between an object and a background may be unevenly shown, for example, in steps. Such a phenomenon is known as "jagging," "jagness," or "zigzag artifact." In the following description, the shape looking like steps is referred to as "jagging."

SUMMARY

Embodiments of the present invention relate to a method of removing jagging of stereoscopic image and a stereoscopic image display device using the same.

One object of the embodiments is to remove jagging occurring when a stereoscopic image display device implements a 3D image in a patterned retarder method.

Another object of the embodiments is to provide smooth edges in stereoscopic images.

Another object of the embodiments is to convert left- and right-eye image data to lessen jagging in a 3D image.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, a method of removing jagging of a stereoscopic image includes: detecting left edges and right edges by analyzing left-eye image data and right-eye image data, replacing the left-eye image data on a $k^{th}$ line with the left-eye image data on a $(k-1)^{th}$ line in response to a first absolute value of a difference between a number of the left edges on the $(k-1)^{th}$ line and a number of the left edges on the $k^{th}$ line being equal to or more than a edge number threshold value, and replacing the right-eye image data on the $k^{th}$ line with the right-eye image data on the $(k-1)^{th}$ line in response to a second absolute value of a difference between a number of the right-eye edge data on the $(k-1)^{th}$ line and a number of the right-eye edge data on the $k^{th}$ line being equal to or more than the edge number threshold value, wherein k is a natural number equal to or more than 2 and equal to or less than n, and wherein n is a number of lines of a display panel.

In another aspect, a stereoscopic image display device includes: a display panel including scan lines and data lines crossing over the scan lines, an image processor including: a jagging removing unit configured to remove jagging of a three-dimensional (3D) image, and a 3D formatter configured to: convert jagging-removed image data according to a 3D format, and output the converted 3D image data, a data driver configured to: convert the converted 3D image data into data voltage, and supply the data voltage to the data lines, and a gate driver configured to sequentially supply gate pulses synchronized with the data voltage to the gate lines, wherein the jagging removing unit includes: an edge detector configured to detect left edges and right edges by analyzing left-eye image data and right-eye image data, and a first data converter configured to: replace the left-eye image data on a $k^{th}$ line with the left-eye image data on a $(k-1)^{th}$ line in response to a first absolute value of a difference between a number of the left edges on the $(k-1)^{th}$ line and a number of the left edges on the $k^{th}$ line being equal to or more than a edge number threshold value, and replace the right-eye image data on the $k^{th}$ line with the right-eye image data on the (k−1)$^{th}$ line in response to a second absolute value of a difference between a number of the right-eye edge data on the (k−1)$^{th}$ line and a number of the right-eye edge data on the k$^{th}$ line being equal to or more than the edge number threshold value, wherein k is a natural number equal to or more than 2 and equal to or less than n, and wherein n is a number of lines of the display panel.

It is to be understood that both the foregoing general description and the following detailed description are examples and explanatory and are intended to provide further explanation of embodiments of the invention as claimed.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention. In the drawings:

FIG. 7 is an example chart illustrating an arrangement of original 3D image data, an arrangement of a left-eye image data, and arrangement of a right-eye image data;

FIG. 9 is an example chart illustrating an example of a 3D format method;

DETAILED DESCRIPTION

Figure 1:
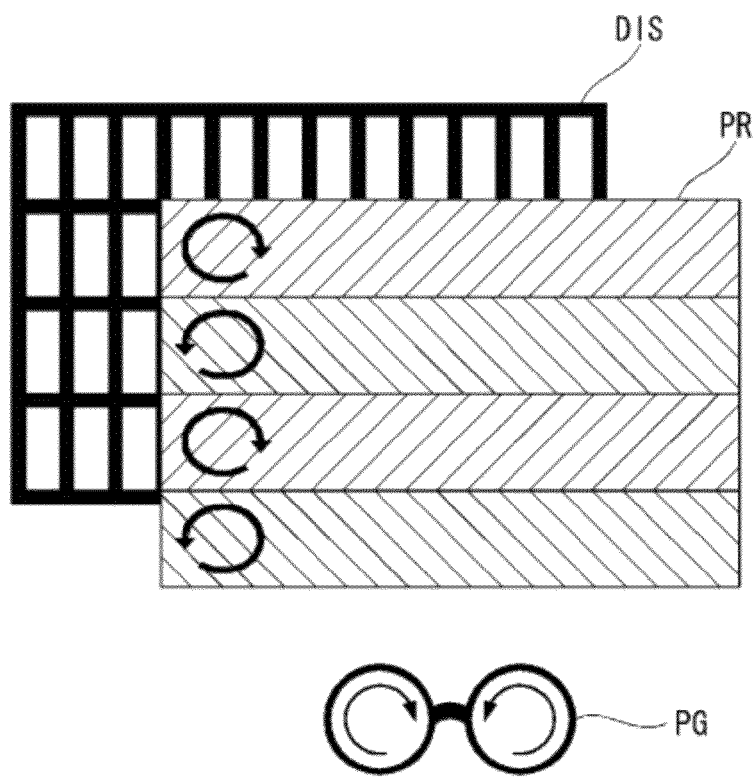
FIG. 1 is an example exploded perspective view illustrating a PR type stereoscopic image display device according to a related art.
Figure 2:
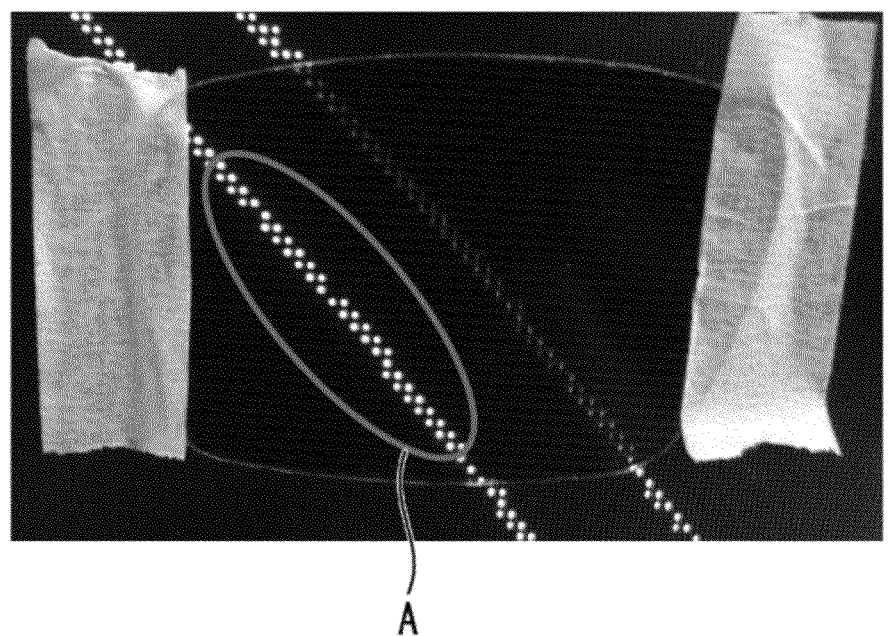
FIG. 2 is an example photograph illustrating a 3D image on which jagging is visible.

Reference will now be made in detail to the preferred embodiments of the present invention, examples of which are illustrated in the accompanying drawings. Like reference numerals designate like elements throughout the specification. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Names of the respective elements used in the following explanations are selected only for convenience of writing the specification and may be thus different from those in actual products.

Figure 3:
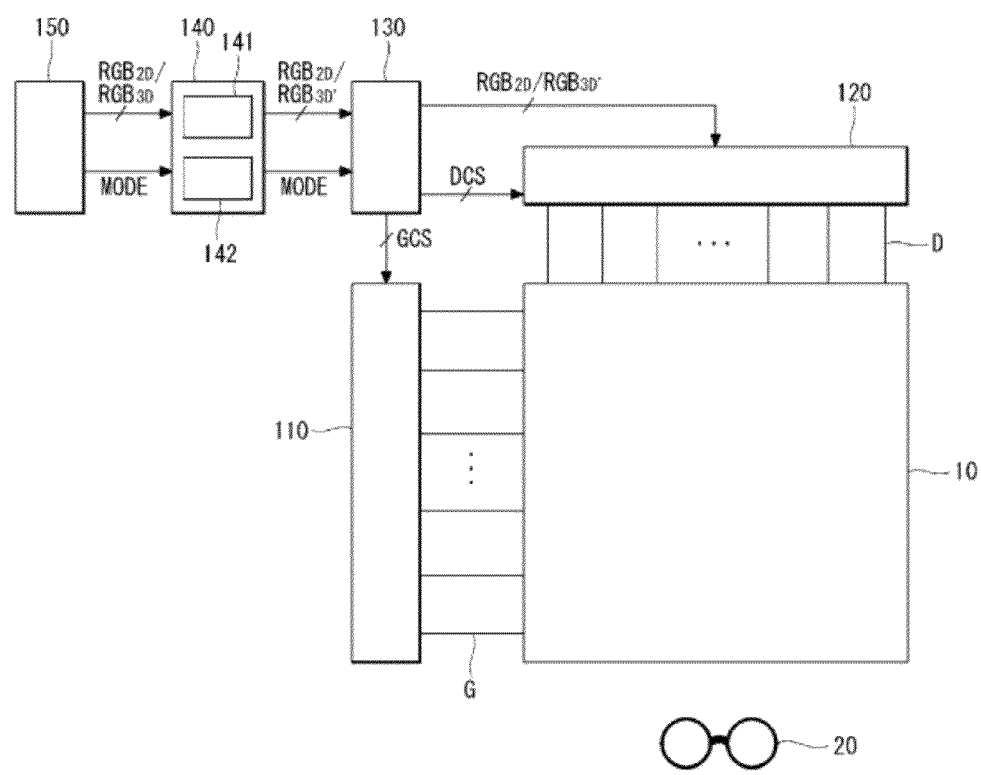
FIG. 3 is a block diagram schematically illustrating an example stereoscopic image display device according to an example embodiment of the invention.
Figure 4:
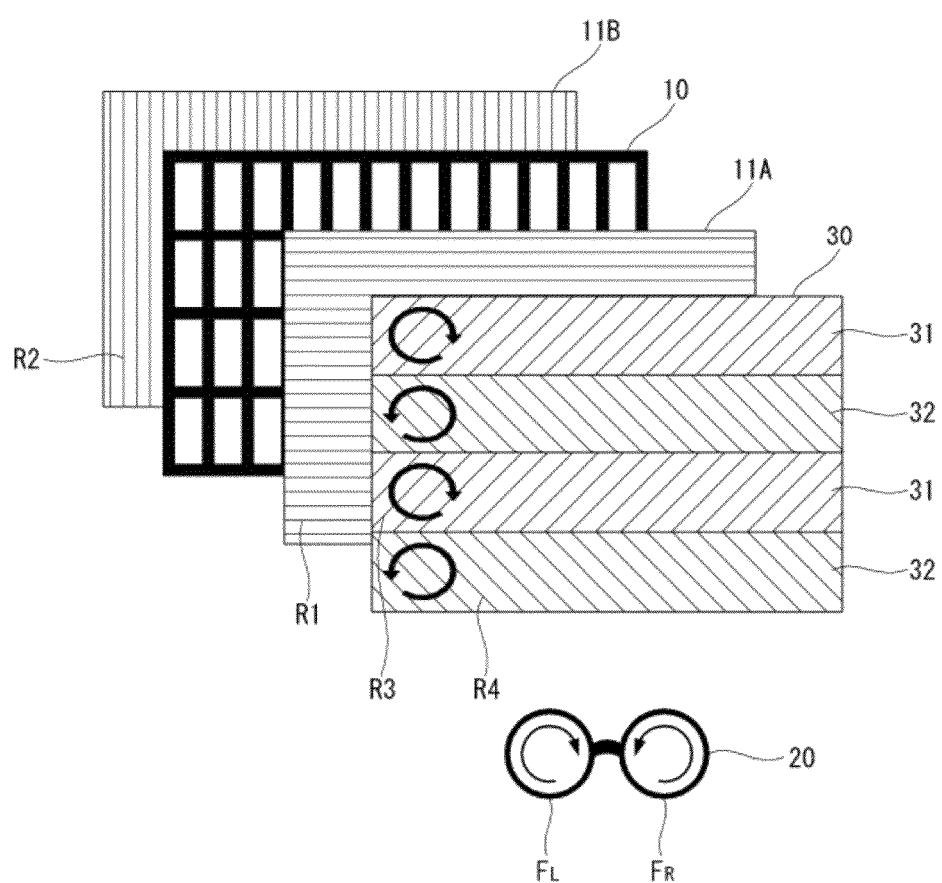
FIG. 4 is an example exploded perspective view illustrating a display panel, a patterned retarder, and polarization glasses.

FIG. 3 is a block diagram schematically illustrating an example stereoscopic image display device according to an example embodiment of the invention. FIG. 4 is an example exploded perspective view illustrating a display panel, a patterned retarder, and polarization glasses. The stereoscopic image display device according to the embodiment of the invention may be implemented as a flat panel display such as a liquid crystal display (LCD), a field emission display (FED), a plasma display panel (PDP) display, and an organic light emitting diode (OLED) display. In the following description, the liquid crystal display (LCD) is described as an example of the stereoscopic image display device. However, embodiments are not limited thereto. For example, other kinds of flat panel display, such as FED, PDP, and OLED, may be used.

With reference to FIGS. 3 and 4, the stereoscopic image display device according to an embodiment of the present invention includes a display panel 10, polarization glasses 20, a gate driver 110, a data driver 120, a timing controller 130, an image processor 140, and a host system 150. The display panel 10 includes a thin film transistor (TFT) substrate and a color filter substrate. A liquid crystal layer is formed between the TFT substrate and the color filter substrate. Data lines D and gate lines (or scan lines) G crossing over the data lines D are formed on the TFT substrate. Pixels are arranged in a matrix form in cell areas defined by the data lines D and the gate lines G. A TFT formed at each of the crossings of the data lines D and the gate lines G transfers a data voltage supplied via the data line D to a pixel electrode of the liquid crystal cell in response to a gate pulse supplied through the gate line G. A common voltage is supplied to a common electrode. Each of pixels is driven by an electric field between the pixel electrode and the common electrode.

A color filter array, including a black matrix and a color filter, is formed on the color filter substrate. The common electrode is formed on the color filter substrate in a vertical electric field driving manner, such as a twisted nematic (TN) mode and a vertical alignment (VA) mode. The common electrode is formed on the TFT substrate along with the pixel electrode in a horizontal electric field driving manner, such as an in-plane switching (IPS) mode and a fringe field switching (FFS) mode. The display panel 10 may be implemented in any liquid crystal mode such as the TN, VA, IPS, and FFS modes.

The display panel 10 may be implemented as a transmissive type liquid crystal panel modulating light from a backlight unit. The backlight unit includes a plurality of light sources, a light guide plate (or a diffusion plate), a plurality of optical sheets, and the like. The backlight unit may be implemented as an edge type backlight unit or a direct type backlight unit. The light sources of the backlight unit may include at least one of a hot cathode fluorescent lamp (HCFL), a cold cathode fluorescent lamp (CCFL), an external electrode fluorescent lamp (EEFL), and a light emitting diode (LED).

The backlight unit driver generates a driving current for turning on the light sources of the backlight unit. The backlight unit driver switches on or off the driving current supplied to the light sources under the control of a backlight controller. The backlight controller may be included in the timing controller 130.

With reference to FIG. 4, an upper polarizing plate 11A is attached to the color filter substrate and a lower polarizing plate 11B is attached to the TFT substrate. A light transmission axis R1 of the upper polarizing plate 11A may be perpendicular to a light transmission axis R2 of the lower polarizing plate 11B. Alignment layers for setting pre-tilt angles of liquid crystals are respectively formed on the TFT substrate and the color filter substrate. A spacer (not shown) is formed between the TFT substrate and the color filter substrate to maintain a cell gap of the liquid crystal layer.

The display panel 10 displays a two-dimensional (2D) image on odd-numbered lines and even-numbered lines thereof in a 2D mode. The display panel 10 displays a left- or right-eye image on the odd-numbered lines and displays a right- or left-eye image on the even-numbered lines in a three-dimensional (3D) mode. The image displayed on the display panel 10 is incident on a patterned retarder 30 disposed on the display panel 10 through the upper polarizing plate 11A.

The patterned retarder 30 includes first retarders 31 formed on the odd-numbered lines thereof and second retarders 32 formed on the even-numbered lines thereof. The first retarders 31 may be opposite to the odd-numbered lines of the display panel 10 and the second retarders 32 may be opposite to the even-numbered lines of the display panel 10. The first retarders 31 may retard a phase of light from the display panel 10 by $+\lambda/4$, where $\lambda$ is a wavelength of light. The second retarders 32 may retard a phase of the light from the display panel 10 by $-\lambda/4$. An optical axis R3 of the first retarder 31 may be perpendicular to an optical axis R4 of the second retarder 32. Therefore, the first retarders 31 may convert the light incident from the display panel 10 into a first circularly polarized light (for example, a left circularly-polarized light). The second retarders 32 may convert the light incident from the display panel 10 into a second circularly polarized light (for example, a right circularly-polarized light). Meanwhile, the patterned retarder 30 may include a black stripe for widening a vertical viewing angle.

The polarization glasses 20 include a left-eye polarization filter $F_L$ passing through the first circularly polarized light converted by the first retarders 31 and a right-eye polarization filter $F_R$ passing through the second circularly polarized light converted by the second retarders 32. For example, the left-eye polarization filter $F_L$ can pass through the left circularly-polarized light, and the right-eye polarization filter $F_R$ can pass through the right circularly-polarized light.

In the example PR (patterned retarder) type stereoscopic image display device, the display panel 10 may display the left image in the odd-numbered lines and the first retarders 31 of the patterned retarder 30, and may convert the left image into the first circularly-polarized light. The left-eye polarization filter $F_L$ may pass through the first circularly-polarized light, and thus a user may view only a left image through his or her left eye. Also, the display panel 10 may display the right image in the even-numbered lines and the second retarders 32 of the patterned retarder 30, and may convert the right image into the second circularly-polarized light. Also, the right-eye polarization filter $F_R$ may pass through the second circularly-polarized light, and thus a user may view only right image through his or her right eye.

The data driver 120 may include a plurality of source driver integrated circuits (ICs). The source driver ICs may receive 2D image data $RGB_{2D}$ or converted 3D image data $RGB_{3D}'$ from the timing controller 130. The source driver ICs may convert 2D image data $RGB_{2D}$ or converted 3D image data $RGB_{3D}'$ received from the timing controller 130 into positive or negative polarity gamma compensation voltage, and may generate positive or negative polarity analog data voltage. The source driver ICs may supply the positive and negative analog data voltages to the data lines D of the display panel 10.

The gate driver 110 may sequentially supply a gate pulse synchronized with the data voltage to the gate lines G of the display panel 10 under the control of the timing controller 130. The gate driver 110 may include a plurality of gate driver ICs. Each of the gate driver ICs may include a shift register, a level shifter for converting an output signal of the shift register into a signal having a swing width suitable for a TFT drive of the liquid crystal cell, an output buffer, and the like.

The timing controller 130 may receive 2D image data $RGB_{2D}$ or the converted 3D image data $RGB_{3D}'$, timing signals, and a mode signal MODE from the image processor 140. The timing controller 130 may generate a gate control signal GCS for controlling the gate driver 110 and a data control signal DCS for controlling the data driver 120, based on the 2D image data $RGB_{2D}$ or the converted 3D image data $RGB_{3D}'$, the timing signals, and the mode signal MODE. The timing signals may include a vertical synchronization signal, a horizontal synchronization signal, a data enable signal, a dot clock, etc. The timing controller 130 may output the gate control signal GCS to the gate driver 110. The timing controller 130 may output the 2D image data $RGB_{2D}$ or the converted 3D image data $RGB_{3D}'$ and the data control signal DCS to the data driver 120.

The host system 150 may supply the 2D image data $RGB_{2D}$ or original 3D image data $RGB_{3D}$ to the image processor 140 through an interface such as a low voltage differential signaling (LVDS) interface and a transition minimized differential signaling (TMDS) interface. Further, the host system 150 may supply the timing signals and the mode signal MODE, for distinguishing the 2D mode from the 3D mode, to the image processor 140.

The image processor 140 may receive the 2D image data $RGB_{2D}$ from the host system 150 in the 2D mode. The image processor 140 may output the 2D image data $RGB_{2D}$ as it is to the timing controller 130, without converting the 2D image data $RGB_{2D}$ in the 2D mode. The image processor 140 may receive the original 3D image data $RGB_{3D}$ from the host system 150 in the 3D mode. The image processor 140 may remove jagging of the original 3D image data $RGB_{3D}$ and may output the converted 3D image data $RGB_{3D}'$ to the timing controller 130. The image processor 140 may convert timing signals in synchronized with a timing of the modulated 3D image data $RGB_{3D}'$ and then may output converted timing signals to the timing controller 130.

The image processor 140 may include a jagging removing unit 141 and a 3D formatter 142. The jagging removing unit 141 and the 3D formatter 142 may bypass the 2D image data $RGB_{2D}$ in the 2D mode. The jagging removing unit 141 may detect jagging of the 3D image and may remove jagging according to the method of removing jagging of the 3D image in the 3D mode. The 3D formatter 142 may convert jagging-removed image data according to the 3D format and then may output the converted 3D image data $RGB_{3D}'$ to the timing controller 130.

The image processor 140 and the method of removing jagging of the 3D image according to the embodiment of the invention are described in detail below with reference to FIGS. 5 and 6.

Figure 5:
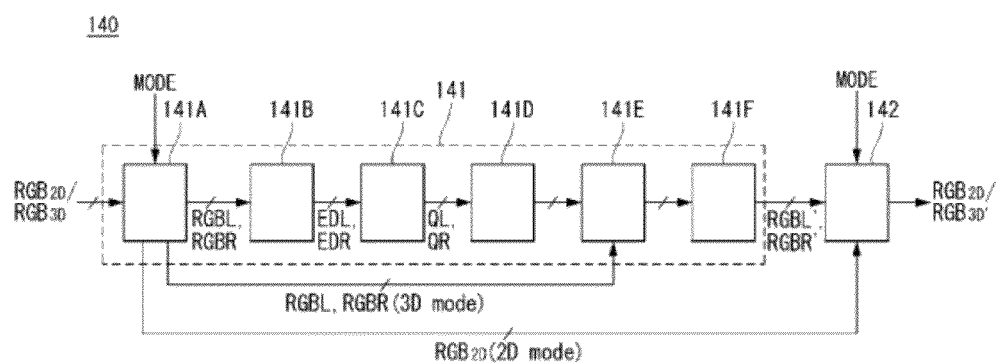
FIG. 5 is a block diagram illustrating an example of the image processor shown in FIG. 3.
Figure 6:
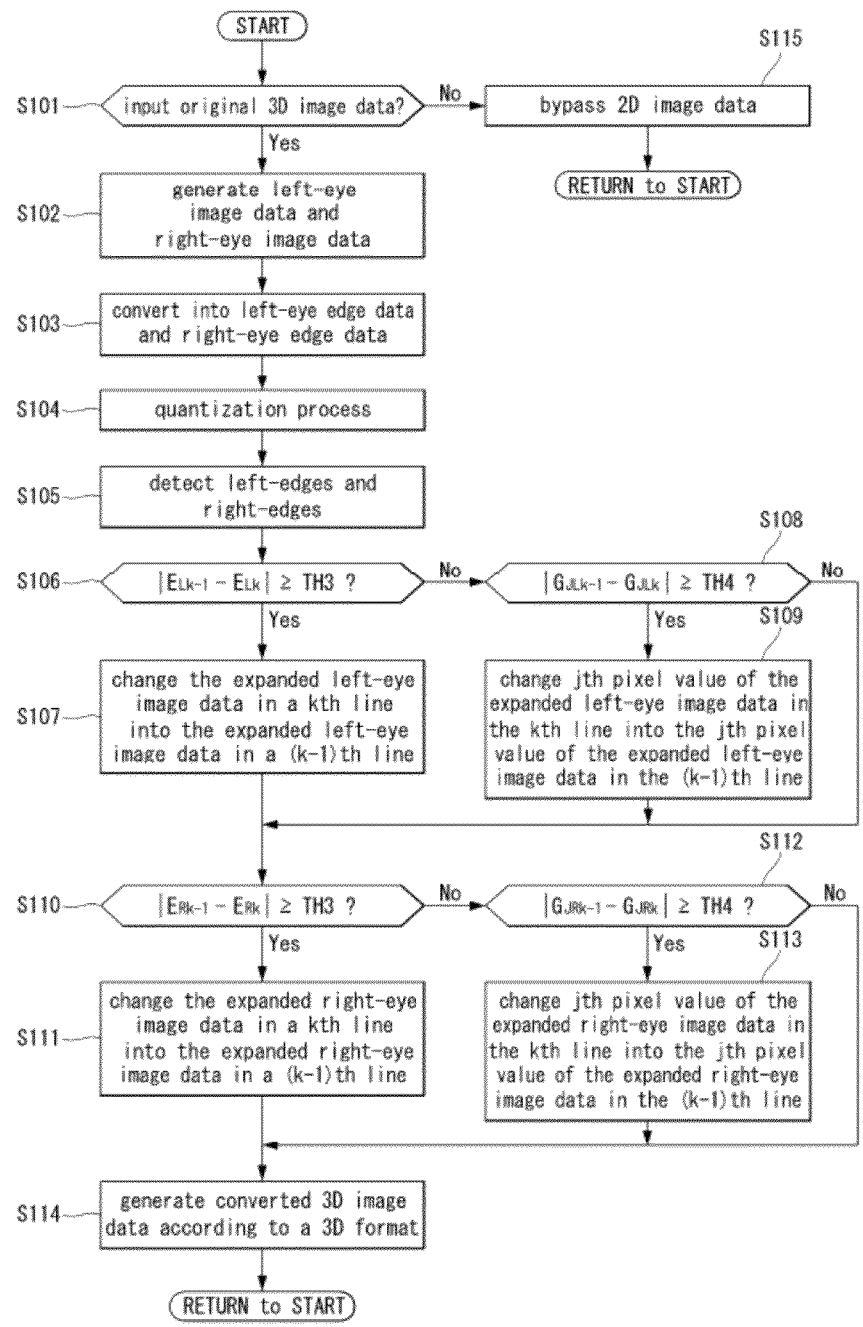
FIG. 6 is a flow chart illustrating an example method of removing jagging of a stereoscopic image according to an example embodiment of the invention.

FIG. 5 is a block diagram illustrating an example of the image processor shown in FIG. 3. FIG. 6 is a flow chart illustrating an example method of removing jagging of a 3D image method according to an example embodiment of the invention. With reference to FIG. 5, the image processor 140 may include the jagging removing unit 141 and the 3D formatter 142. The jagging removing unit 141 may include a data expansion unit 141A, an edge conversion unit 141B, a quantization unit 141C, an edge detecting unit 141D, a first data converter 141E, and a second data converter 141F. The jagging removing unit 141 may perform operations S101 to S113 shown in FIG. 6. The 3D formatter 142 may perform operations S114 and S115 shown in FIG. 6.

The data expansion unit 141A may receive the 2D image data $RGB_{2D}$ or the original 3D image data $RGB_{3D}$ from host system 150. The data expansion unit 141A may receive the mode signal MODE and the timing signals from host system 150. The data expansion unit 141A may distinguish the 2D mode from the 3D mode according to the mode signal MODE. The data expansion unit 141A may bypass the 2D image data $RGB_{2D}$ and timing signals in the 2D mode.

FIG. 7 is an example chart illustrating an arrangement of original 3D image data, e.g., an arrangement of left-eye image data and an arrangement of right-eye image data. With reference to FIGS. 6 and 7, the data expansion unit 141A may receive the original 3D image data $RGB_{3D}$ of one frame, including original left-eye image data ORGBL and original right-eye image data ORGBR. The original 3D image data $RGB_{3D}$ may include the original left-eye image data ORGBL arranged in first to $n^{th}$ lines in a left half portion and the original right-eye image data ORGBR arranged in first to $n^{th}$ lines in a right half portion, where n is a number of horizontal lines of the display panel. The data expansion unit 141A may generate left-eye image data RGBL of one frame by expanding the original left-eye image data ORGBL, and right-eye image data RGBR of one frame by expanding the original right-eye image data ORGBR (S101, S102).

The edge conversion unit 141B may convert the left-eye image data RGBL into left-eye edge data EDL, and the right-eye image data RGBR into right-eye edge data EDR. The edge detection unit 141B may use an edge conversion algorithm such as a sobel mask (operator) method, and so on, in order to convert the left-eye image data RGBL into left-eye edge data EDL and the right-eye image data RGBR to right-eye edge data EDR (S103).

The quantization unit 141C may include a quantization process which quantizes the left-eye edge data EDL and the right-eye edge data EDR in order to prevent the left-eye edge data EDL or the right-eye edge data EDR in a non-edge area from detecting as the left edges and the right edges. The left edges and the right edges may be clearly distinguished from the non-edge area through the quantization process. In one example, the left edges refer to an outline of objects in a left-eye image obtained from the left-eye image data RGBL, and the right edges refer to an outline of objects in a right-eye image obtained from the right-eye image data RGBR.

The quantization unit 141C may generate left-quantization data QL and right-quantization data QR by converting the left-eye edge data EDL and the right-eye edge data EDR that is more than a first threshold value (edge data threshold) into a maximum gray level value, and converting the left-eye edge data EDL and the right-eye edge data EDR that is equal to or less than the first threshold value into a minimum gray level value for the quantization.

The quantization unit 141C may output the left-quantization data QL and the right-quantization data QR to the edge detection unit 141D after finishing the quantization process. However, the quantization unit 141C may be omitted. In one example, the edge conversion unit 141B may output left-eye edge data EDL and right-eye edge data EDR to the edge detection unit 141D.

Figure 8:
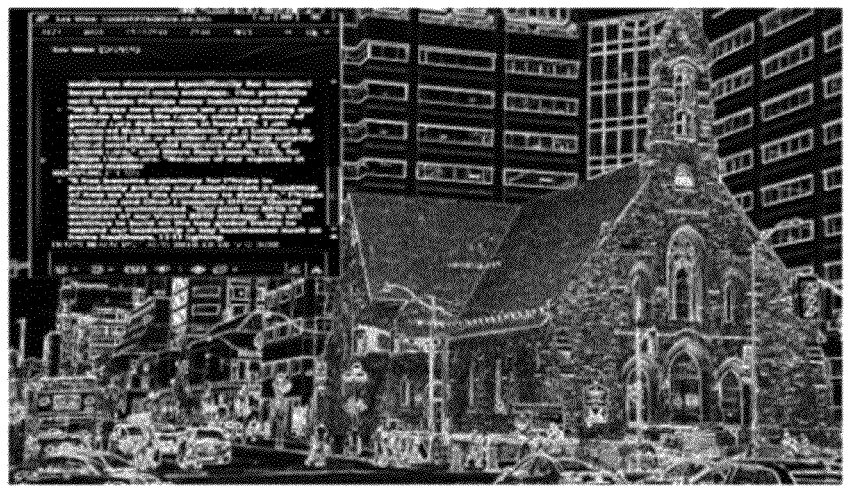
FIG. 8 is an example set of screen shots illustrating a left-eye edge image and a left-eye quantization image.
Figure 8:
Figure 8:
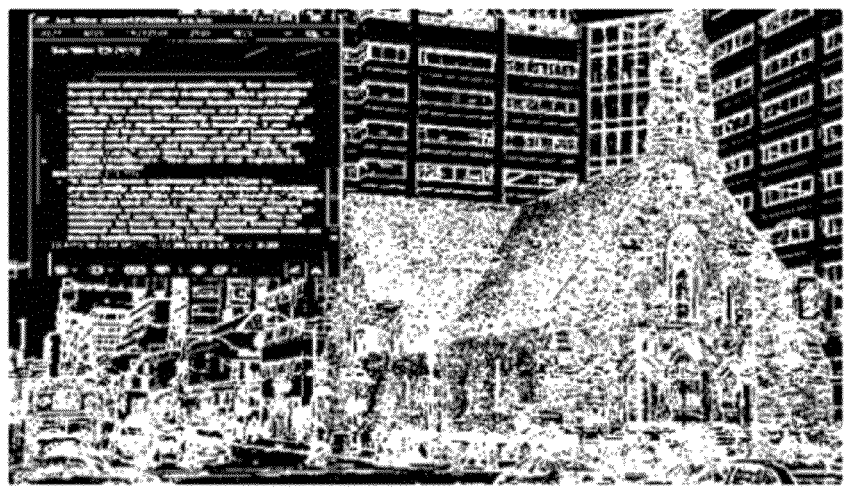

FIG. 8 is an example set of screen shots illustrating a left-eye edge image and a left-eye quantization image. With reference to FIG. 8, the left-eye edge image is obtained from the left-eye edge data EDL, the left-eye quantization image is obtained from the left-quantization data QL. Also, each of the left-eye edge image, the left-eye quantization image, the right-eye edge image, and the right-eye quantization image may be represented as gray level values from "G0" to "G255" when input image data is 8 bits. In one example, the maximum gray level may be a gray level value "G255" and the minimum gray level may be a gray level value "G0". As shown in FIG. 8, edges of the left quantization image and the right quantization image are clearer than those of the left-eye edge image and the right-eye edge image due to the quantization. (See S104 in FIG. 6.)

The edge detection unit 141D may detect left edges by analyzing the left-eye image data RGBL and right edges by analyzing the right-eye image data RGBR. The edge detection unit 141D may detect the left edges and the right edges because jagging may occur in edges of a left image and the right image.

If the quantization unit 141C is omitted, the edge detection unit 141D may receive left-eye edge data EDL and right-quantization data EDR from the edge converter 141B. The edge detection unit 141D may detect the left-eye edge data EDL that is more than a second threshold value (edge detection threshold) as the left edges. The edge detection unit 141D may detect the right-eye edge data EDR that is more than the second threshold value as the right edges. The second threshold value may be appropriately set.

If the quantization unit 141C is not omitted, the edge detection unit 141D may receive left-quantization data QL and right-quantization data QR from the quantization unit 141C. The edge detection unit 141D may detect the left-quantization data QL that is more than the second threshold value as left edges. The edge detection unit 141D may detect the right-quantization data QR that is more than the second threshold value as right edges. (See S105 in FIG. 6.)

The first data converter 141E may count a number of left edges on a $(k-1)^{th}$ line and a number of left edges on a $k^{th}$ line. Also, the first data converter 141E may count a number of right edges on the $(k-1)^{th}$ line and a number of right edges on the $k^{th}$ line. "k" is a natural number more than 2 and less than n.

With reference to Equation 1 below, the first data converter 141E may calculate whether a first absolute value of a difference between the number of the left edges on the $(k-1)^{th}$ line and the number of the left edges on the $k^{th}$ line is equal to or more than a third threshold value TH3 (edge number threshold). The first data converter 141E may calculate whether a second absolute value of a difference between the number of the right edges on the $(k-1)^{th}$ line and the number of left edges on the $k^{th}$ line is equal to or more than the third threshold value TH3. The third threshold value TH3 may be appropriately set.

$$|E_{LK-1} - E_{LK}| \geq TH3$$

$$|E_{RK-1} - E_{RK}| \geq TH3 \quad \text{[Equation 1]}$$

In Equation 1, $E_{LK-1}$ indicates a number of the left edges on the $(k-1)^{th}$ line, $E_{LK}$ indicates a number of the left edges on the $k^{th}$ line, $E_{RK-1}$ indicates a number of the right edges on the $(k-1)^{th}$ line, and $E_{RK}$ indicates a number of the right edges on the $k^{th}$ line.

Meanwhile, if the first absolute value is equal to or more than the third threshold value TH3, it indicates that the left edges on the $(k-1)^{th}$ line may be different from the left edges on the $k^{th}$ line. If the second absolute value is equal to or more than the third threshold value TH3, it indicates that the right edges on the $(k-1)^{th}$ line may be different from the right edges on the $k^{th}$ line. Thus, jagging may occur on the $k^{th}$ line and the $(k-1)^{th}$ line of each of the left-eye image and the right-eye image. Therefore, the first data converter 141E may replace the left-eye image data on the $k^{th}$ line with the left-eye image data on the $(k-1)^{th}$ line in order to improve jagging when the first absolute value is equal to or more than the third threshold value TH3. The first data converter 141E may replace the right-eye image data on the $k^{th}$ line with the right-eye image data on the $(k-1)^{th}$ line in order to improve jagging when the second absolute value is equal to or more than the third threshold value TH3. (See S106, S107, S110, S111 in FIG. 6.)

The second data converter 141F may calculate a third absolute value of a difference between a $j^{th}$ left-eye pixel value of the left-eye image data RGBL on the $(k-1)^{th}$ line and a $j^{th}$ left-eye pixel value of the left-eye image data RGBL on the $k^{th}$ line when the first absolute value is less than the third threshold value TH3. The second data converter 141F may calculate a fourth absolute value of a difference between a $j^{th}$ right-eye pixel value of the right-eye image data RGBR on the $(k-1)^{th}$ line and a $j^{th}$ right eye pixel value of the right-eye image data RGBR on the $k^{th}$ line when the second absolute value is less than the third threshold value TH3. With reference to Equation 2 below, the second data converter 141F may calculate whether the third absolute value is equal to or more than a fourth threshold value TH4 (pixel value threshold) or not. The second data converter 141F may calculate whether a fourth absolute value is equal to or more than the fourth threshold value TH4 or not. "j" is a natural number equal to or more than 1 and equal to or less than m, where m is a number of pixels in any one of horizontal lines of the display panel 10. The fourth threshold value TH4 may be appropriately set.

$$|G_{JLK-1} - G_{JLK}| \geq TH4$$

$$|G_{JRK-1} - G_{JRK}| \geq TH4 \quad \text{[Equation 2]}$$

In equation 2, $G_{JLK-1}$ indicates the $j^{th}$ left-eye pixel value of the left-eye image data RGBL on the $(k-1)^{th}$ line and $G_{JLK}$ indicates the $j^{th}$ left-eye pixel value of the left-eye image data RGBL on the $k^{th}$ line. $G_{JRK-1}$ indicates the $j^{th}$ left-eye pixel value of the right-eye image data RGBR on the $(k-1)^{th}$ line and $G_{JRK}$ indicates the $j^{th}$ right-eye pixel value of the right-eye image data RGBR on the $k^{th}$ line. Each of $G_{JLK-1}$, $G_{JLK}$, $G_{JRK-1}$, and $G_{JRK}$ may be represented as the gray level value. For example, each of $G_{JLK-1}$, $G_{JLK}$, $G_{JRK-1}$, and $G_{JRK}$ may be represented as the gray level value from "G0" to "G255" when input image data is 8 bits.

Meanwhile, if the third absolute value is equal to or more than the fourth threshold value TH4, it may indicate that one of the $j^{th}$ left-eye pixel value of the left-eye image data RGBL on the $(k-1)^{th}$ line and the $j^{th}$ left-eye pixel value of the left-eye image data RGBL on the $k^{th}$ line is not an edge. If the third absolute value is equal to or more than the fourth threshold value TH4, it may indicate that one of the $j^{th}$ right-eye pixel value of the right-eye image data RGBR on the $(k-1)^{th}$ line and the $j^{th}$ right-eye pixel value of the right-eye image data RGBR on the $k^{th}$ line is not an edge. Thus, jagging may occur at a $j^{th}$ pixel on the $k^{th}$ line and a $j^{th}$ pixel on the $(k-1)^{th}$ line of each the left-eye image and the right-eye image. Therefore, the second data converter 141F may replace the $j^{th}$ left-eye pixel value of the left-eye image data RGBL on the $k^{th}$ line with the $j^{th}$ left-eye pixel value of the left-eye image data RGBL on the $(k-1)^{th}$ line in order to improve jagging in response to the third absolute value being equal to or more than the fourth threshold value TH4. The second data converter 141F may replace the $j^{th}$ right-eye pixel value of the right-eye image data RGBR on the $k^{th}$ line with the $j^{th}$ right-eye pixel value of the right-eye image data RGBR on the $(k-1)^{th}$ line in order to improve jagging in response to the fourth absolute value being equal to or more than the fourth threshold value TH4.

Alternatively, the second data converter 141F may replace the $j^{th}$ left-eye pixel value of the left-eye image data RGBL on the $k^{th}$ line with a value calculated through a interpolation in order to improve jagging in response to the third absolute value being equal to or more than the fourth threshold value TH4. For example, the second data converter 141F may replace the $j^{th}$ left-eye pixel value of the left-eye image data RGBL on the K$^{th}$ line with an arithmetical mean of the $j^{th}$ left-eye pixel value of the left-eye image data on the $k^{th}$ line and the $j^{th}$ left-eye pixel value of the left-eye image data on the $(k-1)^{th}$ line in response to the third absolute value being equal to or more than the fourth threshold value TH4. Also, the second data converter 141F may replace the $j^{th}$ right-eye pixel value of the right-eye image data RGBR on the $k^{th}$ line with a value calculated through the interpolation in order to improve jagging in response to the fourth absolute value being equal to or more than the fourth threshold value TH4. For example, the second data converter 141F may replace the $j^{th}$ right-eye pixel value of the right-eye image data RGBR on the $k^{th}$ line with a arithmetical mean of the $j^{th}$ right-eye pixel value of the right-eye image data on the $k^{th}$ line and the $j^{th}$ right-eye pixel value of the right-eye image data on the $(k-1)^{th}$ line in response to the fourth absolute value being equal to or more than the fourth threshold value TH4.

Meanwhile, the first data converter 141E and the second data converter 141F may perform no action in response to the first absolute value being less than the third threshold value TH3 and the third absolute value being less than the fourth threshold value TH4. Also, the first data converter 141E and the second data converter 141F may perform no action in response to the second absolute value being less than the third threshold value TH3 and the fourth absolute value being less than the fourth threshold value TH4.

As a result, the second data converter 141F may output replaced left-eye image data RGBL' which may remove jagging of the left-eye image and replaced right-eye image data RGBR' which may improves jagging of the right-eye image to the 3D formatter. (See S108, S109, S112, S113 of FIG. 6.)

The 3D formatter 142 may receive the replaced left-eye image data RGBL' and the replaced right-eye image data RGBR' from the second data converter 141F. The 3D formatter 142 may convert the replaced left-eye image data RGBL' and the replaced right-eye image data RGBR' to the converted 3D image data RGB3D' according to a 3D format.

FIG. 9 is an example chart illustrating an example of a 3D format method. With reference to FIG. 9, the 3D formatter 142 may generate the converted 3D image data RGB$_{3D}$' of an odd-numbered frame by arranging the replaced left-eye image data RGBL' of odd-numbered lines on the odd-numbered lines of the odd-numbered frame and the replaced right-eye image data RGBR' of even-numbered lines on the even-numbered lines of the odd-numbered frame. Also, the 3D formatter 142 may generate the converted 3D image data RGB$_{3D}$' of an even-numbered frame by arranging the replaced left-eye image data RGBL' of even-numbered lines on the odd-numbered lines of the even-numbered frame and the replaced right-eye image data RGBR' of odd-numbered lines on the even-numbered line of the even-numbered frame. However, embodiments are not limited thereto. Other kinds of 3D formats may be used.

The 3D formatter 142 may output the converted 3D image data RGB$_{3D}$' to the timing controller 130 in the 3D mode. The display panel 10 may display the 3D image removing jagging under the control of the timing controller 130 in the 3D mode. (See S114 of FIG. 6.)

Also, the 3D formatter 142 may receive the 2D image data and the timing signals from the data expansion unit 141A in the 2D mode. The 3D formatter 142 may receive the mode signal MODE from the host system 150. The 3D formatter 142 may distinguish the 2D mode from the 3D mode according to the mode signal MODE. The 3D formatter 142 may bypass the 2D image data $RGB_{2D}$ and timing signals in the 2D mode. Therefore, the 3D formatter 142 may output the 2D image data $RGB_{2D}$ and timing signals to the timing controller in the 2D mode. (See S115 in FIG. 6.)

Figure 10A:
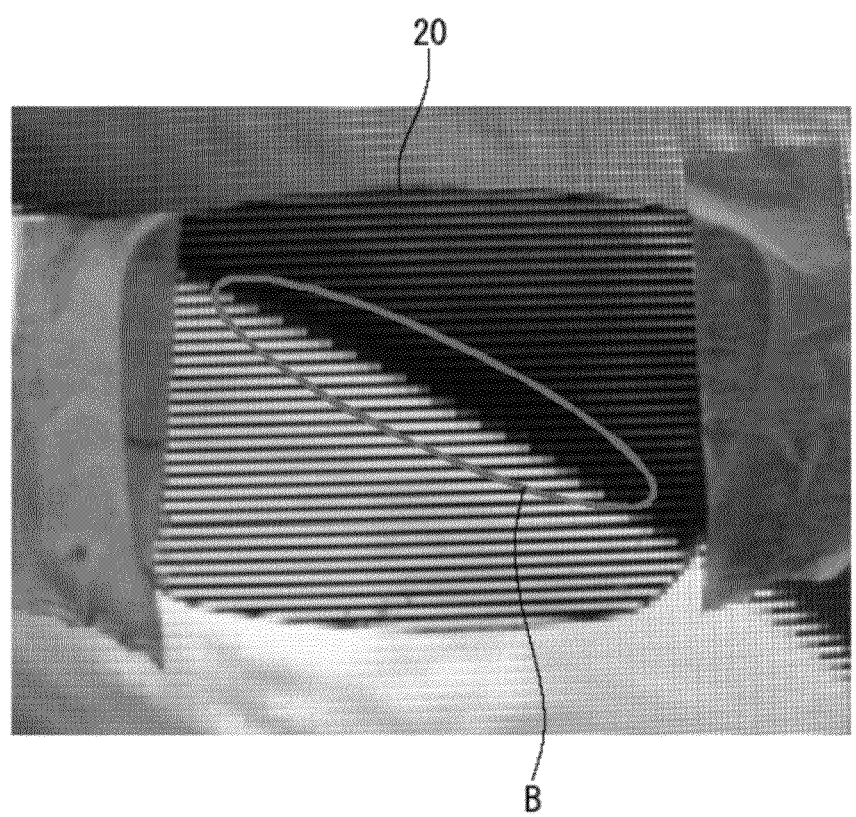
FIG. 10A is an example photograph illustrating a 3D image when a method of removing jagging of a stereoscopic image according to an embodiment of the invention is not applied.
Figure 10B:
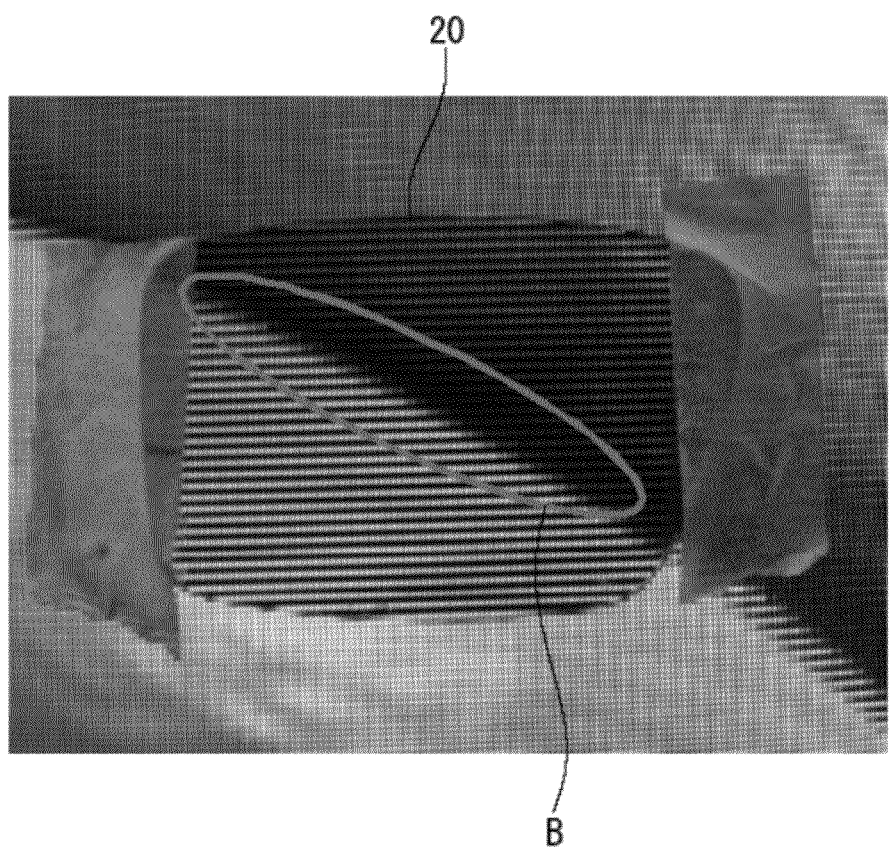
FIG. 10B is an example photograph illustrating a 3D image when a method of removing jagging of a stereoscopic image according to an embodiment of the invention is applied.

FIG. 10A is an example photograph illustrating a 3D image when a method of removing jagging according to the embodiment of the invention is not applied. FIG. 10B is an example photograph illustrating a 3D image when a method of removing jagging according to the embodiment of the invention is applied. FIGS. 10A and 10B illustrate the 3D image shown through the polarization glasses 20 of FIG. 1, one lens of which is shown taped over each image. With reference FIGS. 10A and 10B, an area B indicates one part of a line. Jagging is shown in the area B in FIG. 10A, thus a user may view lines shown as the step-like shape. However, jagging is not shown in the area B in FIG. 10B, thus a user may view lines as shown smoothly. Therefore, embodiments may remove jagging occurring when implementing a 3D image as a patterned retarder method.

As described above, embodiments of the invention may receive original 3D image data and may generate left-eye image data and right-eye image data by expanding the original 3D image data, may change the left-eye image data and the right-eye image data to improve jagging, and may output modulated 3D image data by converting changed left-eye image data and changed right-eye image data according to a 3D format. Therefore, embodiments may improve jagging occurring when implementing a 3D image as a patterned retarder method.

The processes, functions, methods and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

It will be apparent to those skilled in the art that various modifications and variations can be made in the method of removing jagging of stereoscopic image and stereoscopic image display device using the same of embodiments of the present invention without departing from the spirit or scope of the invention. Thus, it is intended that the present invention cover the modifications and variations of this invention provided they come within the scope of the appended claims and their equivalents.

What is claimed is:

1. A method of removing jagging of a stereoscopic image in a stereoscopic display device, comprising:
   detecting left edges and right edges by analyzing left-eye image data and right-eye image data;
   replacing the left-eye image data on a $k^{th}$ line with the left-eye image data on a $(k-1)^{th}$ line in response to a first absolute value of a difference between a number of the left edges on the $(k-1)^{th}$ line and a number of the left edges on the $k^{th}$ line being equal to or more than a edge number threshold value; and
   replacing the right-eye image data on the $k^{th}$ line with the right-eye image data on the $(k-1)^{th}$ line in response to a second absolute value of a difference between a number of the right-eye edge data on the $(k-1)^{th}$ line and a number of the right-eye edge data on the $k^{th}$ line being equal to or more than the edge number threshold value,
   wherein k is a natural number equal to or more than 2 and equal to or less than n, and
   wherein n is a number of lines of a display panel.

2. The method of removing jagging of the stereoscopic image of claim 1, further comprising:
   calculating a third absolute value of a difference between a $j^{th}$ left-eye pixel value of the left-eye image data on the $(k-1)^{th}$ line and a $j^{th}$ left-eye pixel value of the left-eye image data on the $k^{th}$ line in response to the first absolute value being less than the edge number threshold value; and
   calculating a fourth absolute value of a difference between $j^{th}$ right-eye pixel value of the right-eye image data on the $(k-1)^{th}$ line and $j^{th}$ right-eye pixel value of the right-eye image data on the $k^{th}$ line in response to the second absolute value being less than the edge number threshold value,
   wherein j is a natural number equal to or more than 1 and equal to or less than m, and
   wherein m is a number of pixels in any one line of the display panel.

3. The method of removing jagging of the stereoscopic image of claim 2, further comprising:
   replacing the $j^{th}$ left-eye pixel value of the left-eye image data on the $k^{th}$ line with the $j^{th}$ left-eye pixel value of the left-eye image data on the $(k-1)^{th}$ line in response to the third absolute value being equal to or more than a pixel value threshold value; and
   replacing the $j^{th}$ right-eye pixel value of the right-eye image data on the $k^{th}$ line with the $j^{th}$ right-eye pixel value of the right-eye image data on the $(k-1)^{th}$ line in response to the fourth absolute value being equal to or more than the pixel value threshold value.

4. The method of removing jagging of the stereoscopic image of claim 2, further comprising:
   replacing the $j^{th}$ left-eye pixel value of the left-eye image data on the $k^{th}$ line with an arithmetical mean of the $j^{th}$ left-eye pixel value of the left-eye image data on the $k^{th}$ line and the $j^{th}$ left-eye pixel value of the left-eye image data on the $(k-1)^{th}$ line in response to the third absolute value being equal to or more than a pixel value threshold value; and
   replacing the $j^{th}$ right-eye pixel value of the right-eye image data on the $k^{th}$ line to a arithmetical mean of the $j^{th}$ right-eye pixel value of the right-eye image data on the $k^{th}$ line and the $j^{th}$ right-eye pixel value of the right-eye image data on the $(k-1)^{th}$ line in response to the fourth absolute value being equal to or more than the pixel value threshold value.

5. The method of removing jagging of the stereoscopic image of claim 1, further comprising generating converted 3D image data by arranging:
   replaced left-eye image data of an odd-numbered lines to the odd-numbered lines of an odd frame;
   replaced right-eye image data of an even-numbered lines to the even-numbered lines of the odd frame;
   the replaced left-eye image data of the even-numbered lines to the odd-numbered lines of an even frame; and
   the replaced right-eye image data of the odd-numbered lines to the even-numbered lines of the even frame.

6. The method of removing jagging of the stereoscopic image of claim 1, wherein the detecting the left edges and the right edges comprises:
   receiving original 3D image data of one frame having original left-eye image data and original right-eye image data; and
   generating the left-eye image data of one frame by expanding the original left-eye image data and the right-eye image data of one frame by expanding the original right-eye image data.

7. The method of removing jagging of the stereoscopic image of claim 6, wherein the detecting the left edges and the right edges further comprises converting the left-eye image data into left-eye edge data and the right-eye image data into right-eye edge data.

8. The method of removing jagging of the stereoscopic image of claim 6, wherein the detecting the left edges and the right edges further comprises:
   detecting the left-eye edge data that is more than an edge detection threshold value as a left edge; and
   detecting the right-eye edge data that is more than the edge detection threshold value as a right edge.

9. The method of removing jagging of the stereoscopic image of claim 6, wherein the detecting the left edges and the right edges further comprises:
   generating left-quantization data and right-quantization data by:
      converting the left-eye edge data that is more than an edge data threshold value and the right-eye edge data that is more than the edge data threshold value into a maximum gray level value; and
      converting the left-eye edge data and the right-eye edge data that is equal to or less than the edge data threshold value into a minimum gray level value; and
   detecting the left-quantization data that is more than a edge detection threshold value as left edges, and the right-quantization data that is more than the edge detection threshold value as a right-edge.

10. The method of removing jagging of the stereoscopic image of claim 9, wherein the detecting the left edges and the right edges further comprises:
   detecting the left-quantization data that is more than an edge detection threshold value as a left edge; and
   detecting the right-quantization data that is more than the edge detection threshold value as a right edge.

11. A stereoscopic image display device, comprising:
   a display panel comprising scan lines and data lines crossing over the scan lines;
   an image processor comprising:
      a jagging removing unit configured to remove jagging of a three-dimensional (3D) image; and
      a 3D formatter configured to:
         convert jagging-removed image data according to a 3D format; and
         output the converted 3D image data;
   a data driver configured to:
      convert the converted 3D image data into data voltage; and
      supply the data voltage to the data lines; and
   a gate driver configured to sequentially supply gate pulses synchronized with the data voltage to the gate lines,
   wherein the jagging removing unit comprises:
      an edge detector configured to detect left edges and right edges by analyzing left-eye image data and right-eye image data, and
      a first data converter configured to:
         replace the left-eye image data on a $k^{th}$ line with the left-eye image data on a $(k-1)^{th}$ line in response to a first absolute value of a difference between a number of the left edges on the $(k-1)^{th}$ line and a number of the left edges on the $k^{th}$ line being equal to or more than a edge number threshold value, and
         replace the right-eye image data on the $k^{th}$ line with the right-eye image data on the $(k-1)^{th}$ line in response to a second absolute value of a difference between a number of the right-eye edge data on the $(k-1)^{th}$ line and a number of the right-eye edge data on the $k^{th}$ line being equal to or more than the edge number threshold value,
   wherein k is a natural number equal to or more than 2 and equal to or less than n, and
   wherein n is a number of lines of the display panel.

12. The stereoscopic image display device of claim 11, wherein the jagging removing unit further comprises:
   a second data converter configured to:
      calculate a third absolute value of a difference between $j^{th}$ left-eye pixel value of the left-eye image data on the $(k-1)^{th}$ line and $j^{th}$ left-eye pixel value of the left-eye image data on the $k^{th}$ line in response to the first absolute value being less than the edge number threshold value; and
      calculate a fourth absolute value of a difference between $j^{th}$ right-eye pixel value of the right-eye image data on the $(k-1)^{th}$ line and $j^{th}$ right-eye pixel value of the right-eye image data on the $k^{th}$ line in response to the second absolute value being less than the edge number threshold value,
   wherein j is a natural number equal to or more than 1 and equal to or less than m, and
   wherein m is a number of pixels in any one line of the display panel.

13. The stereoscopic image display device of claim 11, wherein the second data converter is further configured to:
   replace the $j^{th}$ left-eye pixel value of the left-eye image data on the $k^{th}$ line with the $j^{th}$ left-eye pixel value of the left-eye image data on the $(k-1)^{th}$ line in response to the third absolute value being equal to or more than a pixel value threshold value; and
   replace the $j^{th}$ right-eye pixel value of the right-eye image data on the $k^{th}$ line to the $j^{th}$ right-eye pixel value of the right-eye image data on the $(k-1)^{th}$ line when the fourth absolute value is equal to or more than the pixel value threshold value.

14. The stereoscopic image display device of claim 12, wherein the second data converter is further configured to:
   replace the $j^{th}$ left-eye pixel value of the left-eye image data on the $k^{th}$ line to a arithmetical mean of the $j^{th}$ left-eye pixel value of the left-eye image data on the $k^{th}$ line and the $j^{th}$ left-eye pixel value of the left-eye image data on the $(k-1)^{th}$ line in response to the third absolute value being equal to or more than the pixel value threshold value; and replace the $j^{th}$ right-eye pixel value of the right-eye image data on the $k^{th}$ line to a arithmetical mean of the $j^{th}$ right-eye pixel value of the right-eye image data on the $k^{th}$ line and the $j^{th}$ right-eye pixel value of the right-eye image data on the $(k-1)^{th}$ line in response to the fourth absolute value being equal to or more than the pixel value threshold value.

15. The stereoscopic image display device of claim 11, wherein the 3D formatter is further configured to generate the converted 3D image data by arranging:
- a replaced left-eye image data of an odd-numbered lines on the odd-numbered lines of an odd frame;
- a replaced right-eye image data of an even-numbered lines on the even-numbered lines of the odd frame;
- the replaced left-eye image data of the even-numbered lines on the odd-numbered lines of an even frame; and
- the replaced right-eye image data of the odd-numbered lines on the even-numbered lines of the even frame.

16. The stereoscopic image display device of claim 11, wherein the edge detector comprises a data expansion unit configured to:
- receive original 3D image data of one frame comprising original left-eye image data and original right-eye image data; and
- generate left-eye image data of one frame by expanding the original left-eye image data, and right-eye image data of one frame by expanding the original right-eye image data.

17. The stereoscopic image display device of claim 16, wherein the edge detection unit further comprises an edge conversion unit configured to convert the left-eye image data into left-eye edge data, and the right-eye image data into right-eye edge data.

18. The stereoscopic image display device of claim 16, wherein the edge detection unit is further configured to detect:
- the left-eye edge data that is more than a edge detection threshold value as a left edge; and
- the right-eye edge data that is more than the edge detection threshold value as a right edge.

19. The stereoscopic image display device of claim 16, wherein the edge detection unit further comprises a quantization unit configured to:
- generate left-quantization data and right-quantization data by converting the left-eye edge data that is more than a edge data threshold value and the right-eye edge data that is more than the edge data threshold value into the maximum gray level value; and
- convert the left-eye edge data and the right-eye edge data that is equal to or less than the edge data threshold value into a minimum gray level value.

20. The stereoscopic image display device of claim 19, wherein the edge detection unit is further configured to detect:
- the left-quantization data that is more than a edge detection threshold value as a left edge; and
- the right-quantization data that is more than the edge detection threshold value as a right edge.

* * * * *